(No Model.) 2 Sheets—Sheet 2.
C. G. GUMPEL.
PORTABLE ELECTRIC BATTERY AND LAMP.
No. 296,331. Patented Apr. 8, 1884.
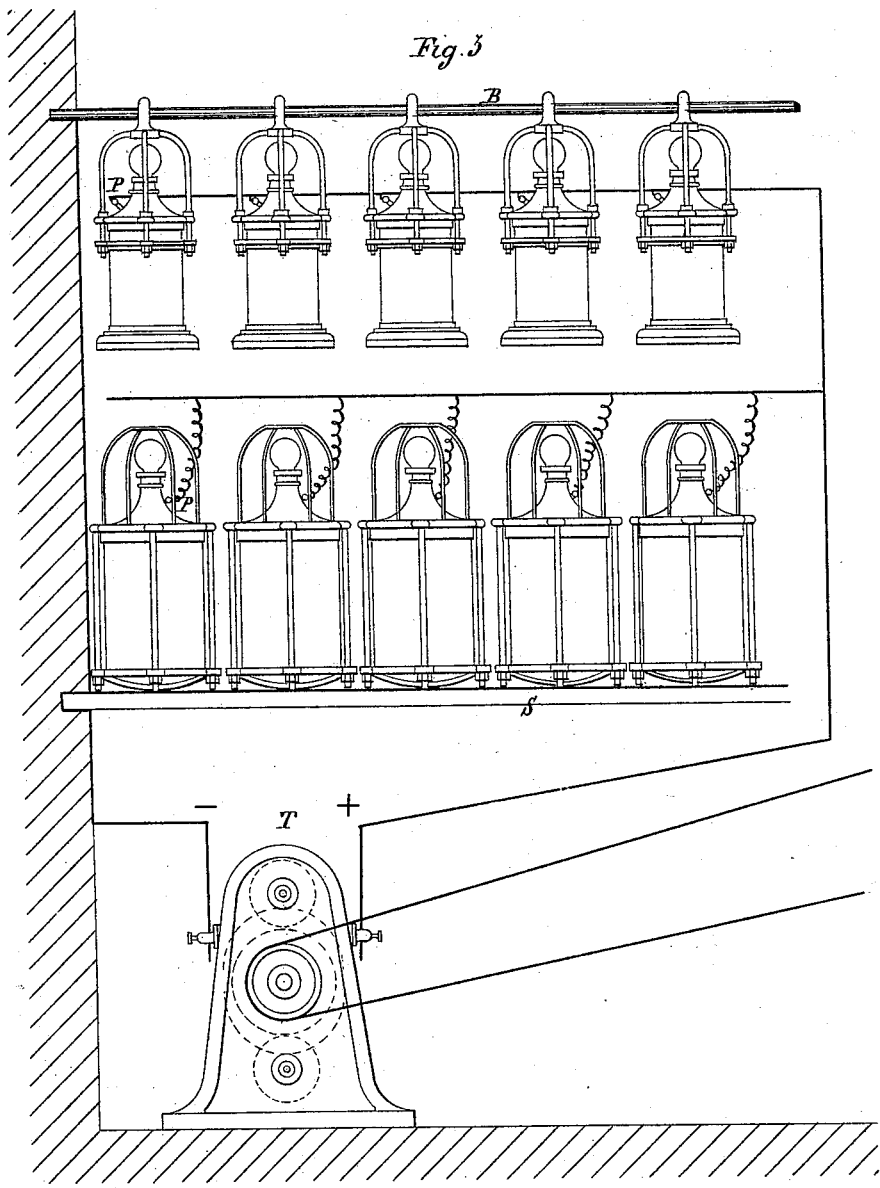

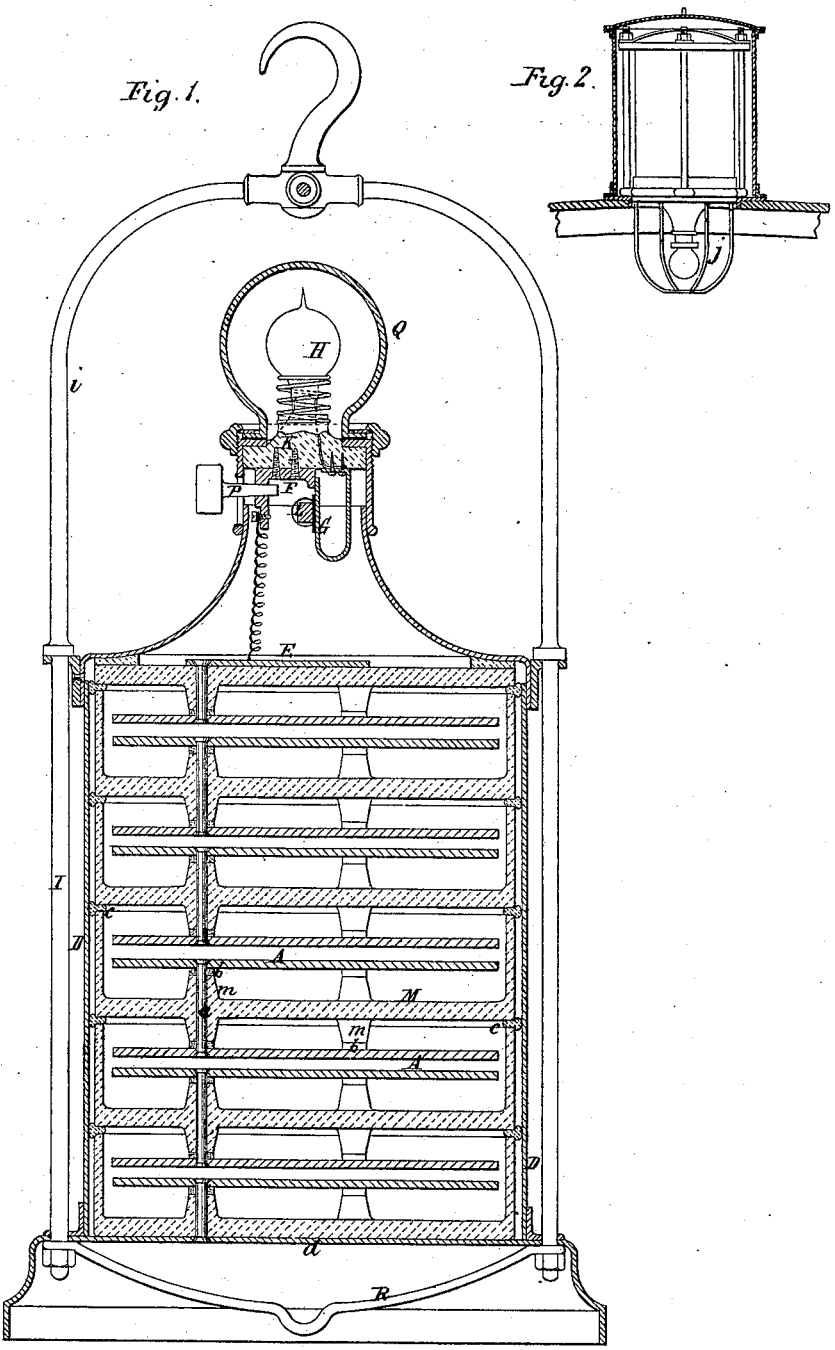

UNITED STATES PATENT OFFICE.

CHARLES GODFREY GUMPEL, OF LEICESTER SQUARE, COUNTY OF MIDDLESEX, ENGLAND.

PORTABLE ELECTRIC BATTERY AND LAMP.

SPECIFICATION forming part of Letters Patent No. 296,331, dated April 8, 1884.

Application filed March 7, 1883. (No model.) Patented in England June 12, 1882, No. 2,756, and in France December 8, 1882, No. 152,525.

*To all whom it may concern:*

Be it known that I, CHARLES GODFREY GUMPEL, a citizen of England, residing at Leicester Square, in the county of Middlesex, England, have invented a new or Improved Portable Electric Battery and Lamp, (for which I have obtained a patent in Great Britain No. 2,756, dated June 12, 1882, and in France No. 152,525, dated December 8, 1882,) of which the following is a specification.

My invention relates to a construction of secondary batteries so as to render them conveniently portable, and to the arrangement, in combination with such batteries, of electric lamps applicable for lighting in mines, houses, carriages, ships, and elsewhere.

I will describe the construction and arrangement of a combined battery and lamp according to my invention, referring to the accompanying drawings.

Figure 1 is a vertical section of the portable battery and lamp, such as might be used in mines. Fig. 2 shows how it can be applied in an inverted position as a ceiling-light for a railway carriage or apartment; and Fig. 3 shows, diagrammatically, a convenient arrangement for charging a number of the batteries from a dynamo-electric machine or other source of electricity.

The battery consists of a number of dishes or trays, M, made of ceramic or other suitable non-conducting material, each tray having a metallic plate, A, on each side of it, the two plates in each case being secured to each other and to the tray by rivets $a$, of the same metal as the plates, passed through holes in bosses $m$, projecting from the tray. The plates A are such as are employed in secondary batteries, usually of lead, and in most cases not made as solid plates presenting only external surface, but made up of the metal in a subdivided form, so as to prevent a very large surface in moderate bulk and weight. As there are many kinds of such plates known and used I need not more particularly describe their construction. Between the plates and the bosses $m$, I interpose washers $b$, of caoutchouc or other elastic material, to deaden shocks resulting from sudden movements of the apparatus. A number of the trays M, provided with their plates A, and filled with suitable liquid, are superposed in each case with an elastic ring, C, interposed between the edge of one tray and the bottom of the next above it, and the whole pile is inclosed within a casing, D, which may be of metal, or of material that does not conduct electricity, made with a conducting bottom, $d$, to which the lowest plate, A, is connected by its rivets.

Although I have shown in Fig. 1 the application of elastic rings C for rendering the junctions of the successive trays tight against leakage, this being the arrangement which I adopt when the trays are made of glass, ceramic material, vulcanite, or other hard insulating substance, it is obvious that when the junctions can be rendered tight by cementing these rings are unnecessary. For example, the trays may be made of gutta-percha or other material which can be partially fused, so as to form a soldered junction, and as the plates A when once formed, and the liquid contained in the trays, require no change, the junctions of the trays may be thus rendered permanent. The highest of the plates A is also connected by its rivets to a metal plate, E, in electrical connection with a metal bracket, F, against which bears a spring, G, which is connected to one of the wires of an incandescent lamp contained in the vacuum-bulb. The other wire of the lamp is connected to the upper part of the casing D and through it, if it be metallic, or through tie-bolts I, to the lowest of the plates A. The bracket F is insulated from the casing D, being attached to a block of insulating material, K, and thus when the parts are in the position shown the current of the battery passes through the filament of the incandescent lamp.

When it is desired to extinguish the lamp a rectangular spindle, L, is turned one-quarter round by an external knob or handle, and this bearing against a facing of insulating material on the spring G pushes the spring away from F, thus breaking the contact for the lamp-circuit. A hole is provided in F for the insertion of a metal pin or plug, P, to charge the battery, as I will presently explain.

It is preferred to mount the lamp-bulb H on a spring to prevent injury from shocks, and when the lamp is used in exposed situations, and particularly in mines, I prefer to inclose the lamp-bulb within an outer bulb, Q, of strong glass.

The tie-bolts I are conveniently made, as shown, to join into a bow at the top with a hook for carrying or suspending the apparatus, and a bow, R, may also be provided at the bottom for suspending it in an inverted position. For lighting from a ceiling—as in a railway-carriage—the apparatus can be placed as shown in Fig. 2 and in this case instead of using tie-bolts forming a bow, i, as shown in Fig. 1, a lantern, or glass bowl, or wire-work, j, may be used to protect the lamp. For the purpose of charging a number of the batteries, they may be arranged as shown in Fig. 3, placing them on a metal shelf, S, or hanging them from a bar, B, electrically connected with one electrode of the charging machine or battery T, while their charging-plugs P are connected with the other electrode.

Having thus described the nature of my invention and the best means I know of for carrying it out in practice, I claim—

A portable secondary electric battery consisting of a suspending-frame and a number of dishes piled one on the other within a case or frame, with their junctions made tight against leakage of liquid, each dish having tubular projecting bosses, through which pass rivets or their equivalents, electrically connecting an electrode-plate above the dish with a plate below, substantially as herein described.

In testimony whereof I have signed my name to this specification, in the presence of two subscribing witnesses, this 19th day of February, A. D. 1883.

CHARLES GODFREY GUMPEL.

Witnesses:
 JNO. P. M. MILLARD,
 H. IMRAY.